E. S. DONISTHORPE.
INDICATING AND TOTALIZING MECHANISM.
APPLICATION FILED JULY 29, 1909.
953,261.
Patented Mar. 29, 1910.
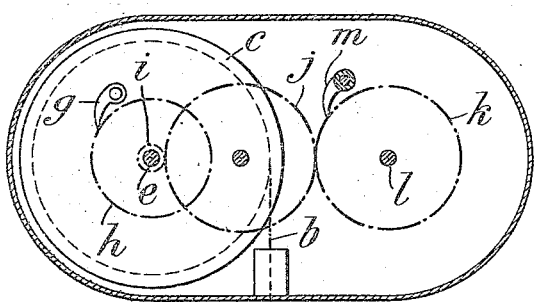
Fig. 1.
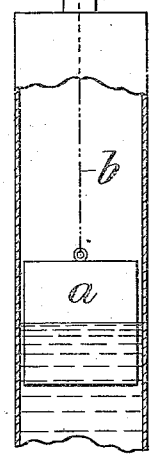
Fig. 3.
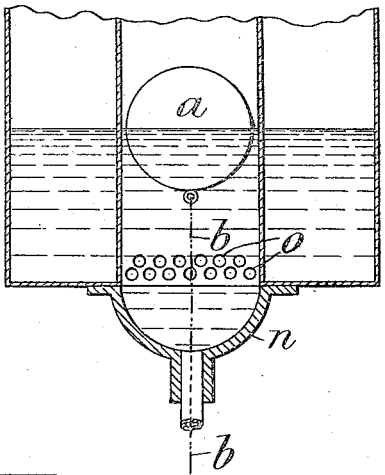
Fig. 2.
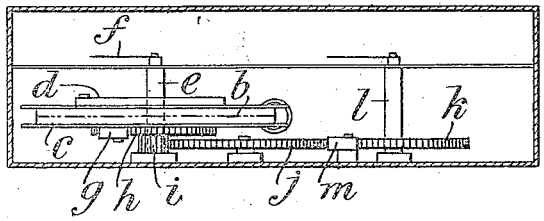
Witnesses
Inventor
Edmund Seal Donisthorpe
By his Attorney

UNITED STATES PATENT OFFICE.

EDMUND SEAL DONISTHORPE, OF LONDON, ENGLAND.

INDICATING AND TOTALIZING MECHANISM.

953,261.  Specification of Letters Patent.  Patented Mar. 29, 1910.

Application filed July 29, 1909. Serial No. 510,289.

*To all whom it may concern:*

Be it known that I, EDMUND SEAL DONISTHORPE, gentleman, a subject of the King of Great Britain, residing at 5 Southampton street, Strand, London, England, have invented new and useful Improvements in Indicating and Totalizing Mechanism, of which the following is a specification.

This invention relates to improvements in means for indicating the amount of liquid in a vessel and also registering the total amount of liquid poured into the vessel, and is especially adapted for indicating the amount of the petrol in the petrol tank of an automobile, and at the same time registering the total amount of petrol which is poured into the tank, which petrol may be poured in at different times.

The drawings illustrate apparatus made in accordance with my invention.

Figure 1 is a side elevation partly in section and Fig. 2 a plan showing the casing in section. Fig. 3 illustrates a modification.

$a$ is a float in the petrol tank or in a subsidiary vessel in connection with the petrol tank and is connected by a chain $b$ to a drum $c$, a spring $d$ constantly tends to turn the drum so as to wind the chain on it when the float rises. On the shaft $e$ of the drum $c$ is a pointer $f$ which indicates the height of petrol. When petrol is poured into the tank the float $a$ rises and the drum $c$ also revolves and by means of a pawl $g$ turns the toothed wheel $h$, free to turn on a sleeve on the shaft $e$. The wheel $h$ is geared by the wheels $i$ and $j$ to the wheel $k$, so that when the wheel $h$ turns the wheel $k$ also turns. On the shaft $l$ of the wheel $k$ is a pointer which registers the amount of petrol poured into the tank. The wheel $k$ is provided with a spring pawl $m$ which prevents backward revolution of the wheel $k$.

In Fig. 3 the chain $b$ is attached to the under side of the float $a$ and a cup shaped extension $n$ is provided to contain the float when the tank is empty. The petrol enters through perforations $o$ at the bottom of the tank near the top of the cup.

What I claim is:—

1. The combination of a tank, a float in the tank, a drum, means for connecting the float and drum, a spring tending to turn the drum in one direction, a pointer, means for connecting the pointer with the drum, a ratchet wheel, means carried by the drum whereby said ratchet wheel is operated in one direction only, a second pointer, gearing connecting said second pointer with said ratchet wheel, and means for preventing said second pointer from moving in one direction.

2. The combination of a tank, a float therein, means connecting the float and drum, a spring for moving the drum in one direction, a pointer, means connecting the pointer with said drum to cause it to move therewith in both directions to indicate the position of the float in the tank, a second pointer to indicate the total amount of liquid poured into the tank, and means connecting said second pointer with the drum whereby said second pointer is moved in one direction only by the drum.

3. An apparatus for indicating the amount of liquid in a vessel and for registering the total amount of liquid poured into it, comprising a tank for the liquid, a float therein, a drum, a flexible connection between the float and drum, a spring for rotating the drum as the float rises, a pointer, means connecting the pointer with the drum to cause it to move therewith when said drum rotates in either direction, a second pointer for indicating the amount of liquid poured into the vessel, means for preventing this pointer from moving in one direction, ratchet mechanism, means carried by the drum for operating this ratchet mechanism in one direction only, and means connecting said ratchet mechanism with the second pointer.

4. The combination of a tank, a float in the tank, a drum, a flexible connection between the drum and the float, a spring for moving the drum in one direction as the float rises, a pointer, means connecting the pointer with the drum to cause said pointer to indicate the position of the float in the tank, a second pointer for indicating the total amount of liquid poured into the vessel, means for preventing this second pointer from moving in one direction, a ratchet wheel, means connecting said ratchet wheel with said second pointer, and a pawl carried by the drum and engaging said ratchet wheel for moving it when the drum is moved by the spring as the float rises.

EDMUND SEAL DONISTHORPE.

Witnesses:
FRANK WOODWORTH DONISTHORPE,
H. D. JAMESON.